(12) United States Patent
Rist et al.

(10) Patent No.: US 9,729,725 B2
(45) Date of Patent: Aug. 8, 2017

(54) METHOD AND SYSTEM FOR ESTABLISHING TELECOMMUNICATIONS LINKS

(71) Applicant: Unify GmbH & Co. KG, Munich (DE)

(72) Inventors: Claus Rist, Bochum (DE); Martin Glaser, Bergkamen (DE); Michael Volkmann, Herdecke (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/890,517

(22) PCT Filed: May 26, 2014

(86) PCT No.: PCT/EP2014/001415
§ 371 (c)(1),
(2) Date: Nov. 11, 2015

(87) PCT Pub. No.: WO2014/187573
PCT Pub. Date: Nov. 27, 2014

(65) Prior Publication Data
US 2016/0094717 A1    Mar. 31, 2016

(30) Foreign Application Priority Data

May 24, 2013 (DE) .......................... 10 2013 008 933

(51) Int. Cl.
*H04M 7/00* (2006.01)
*H04L 29/06* (2006.01)
(Continued)

(52) U.S. Cl.
CPC ........ *H04M 7/0012* (2013.01); *H04L 65/105* (2013.01); *H04L 65/1006* (2013.01);
(Continued)

(58) Field of Classification Search
CPC .. H04M 7/006; H04M 3/5191; H04M 3/5183; H04M 3/5237; H04M 3/42323;
(Continued)

(56) References Cited

U.S. PATENT DOCUMENTS 6,647,109 B1    11/2003    Henderson
7,995,589 B2 *   8/2011    Sollee ................. H04M 1/2535
                                                 370/352

(Continued)

FOREIGN PATENT DOCUMENTS

DE         10159636 A1    6/2003
DE      102006001226 A1    7/2007
(Continued)

OTHER PUBLICATIONS

Written Opinion of the International Searching Authority for PCT/EP2014/001415 dated Sep. 2, 2014 (Form PCT/ISA/237) (English Translation).

(Continued)

*Primary Examiner* — Ahamd F Matar
*Assistant Examiner* — Kharye Pope
(74) *Attorney, Agent, or Firm* — Buchanan Ingersoll & Rooney PC (57) ABSTRACT

The invention relates to a method for establishing a telecommunications link (C1, C2, C3), controlled by a control program (28), with a second communications terminal (D1), according to which a CTI service is made available to the first communications terminal (36) by a CTI server (20) in a CTI domain allocated to said CTI server (20), and the second communications terminal (D1) is located outside the CTI domain and by way of a proxy (Trk2) situated within the CTI domain is linked to the CTI server (20). The control program (28) is linked to the CTI server (20) by way of an intermediate functional unit (30, 32). The intermediate func- (Continued)

tional unit (30, 32) signals to the control program (28) that the second communications terminal (D1) instead of the proxy (Trk2) is linked into the established telecommunications link (C1, C2, C3) as the telecommunications terminal. The intermediate functional unit (30, 32) instructs the CTI server (20) to carry out the CTI service on the proxy (Trk2) in accordance with the control program (28). Furthermore, an intermediate functional unit (extra domain device, CSP) can be implemented as additional server or middleware. The invention further provides a corresponding system.

20 Claims, 5 Drawing Sheets

(51) Int. Cl.
   *H04L 12/66* (2006.01)
   *H04M 3/42* (2006.01)

(52) U.S. Cl.
   CPC ..... *H04M 3/4234* (2013.01); *H04M 3/42323* (2013.01); *H04M 7/0036* (2013.01); *H04M 3/42042* (2013.01); *H04M 3/42263* (2013.01)

(58) Field of Classification Search
   CPC ............. H04M 7/1245; H04M 7/1255; H04M 1/2535; H04M 7/0027; H04M 2207/12; H04M 2207/203; H04M 7/1205; H04L 29/06027; H04L 65/4007; H04L 12/66; H04L 2012/6472; H04L 29/06; H04L 65/1006; H04L 65/1069; H04L 65/1009; H04L 63/0281
   USPC ......... 370/352, 356, 401, 353, 260; 379/265.09, 211.02, 201.01, 202.01, 379/142.15, 225, 309
   See application file for complete search history.

(56) References Cited

U.S. PATENT DOCUMENTS

| | | | |
|---|---|---|---|
| 2003/0115353 A1* | 6/2003 | Deryugin | G06Q 10/06 709/231 |
| 2004/0120502 A1* | 6/2004 | Strathmeyer | H04M 3/51 379/265.01 |
| 2005/0141483 A1* | 6/2005 | Wengrovitz | H04L 12/581 370/352 |
| 2005/0174987 A1* | 8/2005 | Raghav | H04L 29/06027 370/351 |
| 2006/0133349 A1* | 6/2006 | Kan | H04M 3/5191 370/352 |
| 2009/0052437 A1* | 2/2009 | Taylor | H04M 7/006 370/352 |
| 2009/0181657 A1* | 7/2009 | Ramanathan | H04M 1/2535 455/415 |
| 2009/0232127 A1* | 9/2009 | Jaiswal | H04L 43/0817 370/352 |
| 2010/0220609 A1* | 9/2010 | Lobzakov | H04M 3/42314 370/252 |
| 2011/0002326 A1* | 1/2011 | Hwang | H04L 12/66 370/352 |
| 2011/0026517 A1* | 2/2011 | Capuozzo | H04M 3/42323 370/352 |
| 2011/0255680 A1* | 10/2011 | Vuong | H04M 3/42374 379/201.02 |
| 2014/0314022 A1* | 10/2014 | Rathnam | H04W 92/02 370/329 |

FOREIGN PATENT DOCUMENTS

| | | |
|---|---|---|
| DE | 202011003225 U1 | 6/2011 |
| WO | 98/51092 A1 | 11/1998 |

OTHER PUBLICATIONS

International Search Report for PCT/EP2014/001415 dated Sep. 2, 2014 (Form PCT/ISA/210) (German).
Written Opinion of the International Searching Authority for PCT/EP2014/001415 dated Sep. 2, 2014 (Form PCT/ISA/237) (German).

* cited by examiner

BEFORE (before service execution) | AFTER (after service execution)

DEVICES

D1 : transferring device
D2 : transferred device
D3 : device that was transferred to

CALLS

C1 : Active call
C3 : Transferred call

CONNECTIONS INVOLVED

D1 C1 : Connection of the active call
D3C3 : Connection of the transferred call

CONNECTION STATUSES a : Status: ringing
c : Status: connected
f : Status: failed
n : Status: Zero
q : Status: in queue
h : Status: on hold

METHOD AND SYSTEM FOR ESTABLISHING TELECOMMUNICATIONS LINKS

CROSS-REFERENCE TO RELATED APPLICATIONS

This application is the United States national phase under 35 U.S.C. §371 of PCT International Patent Application No. PCT/EP2014/001415, filed on May 26, 2014, and claiming priority to German patent application no. 10 2013 008 933.6, filed on May 24, 2013.

BRIEF DESCRIPTION OF THE INVENTION

Field of the Invention

Embodiments relate to methods for establishing a telecommunications connection between at least two terminals. Further embodiments relate to systems and methods for establishing a telecommunications connection.

Background of the Related Art

The integration of telecommunication networks and data networks is becoming increasingly important. Telecommunication networks are used primarily for communication by telecommunication subscribers using telecommunication terminals such as telephones. Data networks are used primarily for networking computers, for example PCs with servers. Methods and arrangements in which applications installed on computers control and monitor communication systems and communication connections are generally known as CTI solutions (CTI=Computer Telephony Integration). Both communication system ports and connections between ports can be controlled and monitored in this manner. The respective connections are temporary communication channels between two or more subscribers to one or more communication systems.

When operating a CTI solution, data having control and status information are transmitted between a communication system and a CTI application (CTI application program). To this end, communication systems have special interfaces for the data exchange, CTI interfaces. The applications or PCs, respectively, likewise have corresponding CTI interfaces for this data exchange. The CTI interfaces of the communication system and those of the application are connected to one another via a data line or a data network for this purpose. Because the maximum number of CTI interfaces in a communication system is limited, a telephony server is often connected between the communication system and the applications.

Publication WO 98/51092 A 1 "Computer telephony integration gateway" shows a public communications network with multiple communication systems and a private communications network with several domains, each having computers with applications for controlling and/or monitoring resources of the public communications network. The arrangement shown features a "CTI gateway" as a conversion device, which changes the type of data sent for controlling and/or monitoring resources from the public communication network to the private communication network, so that these data appear as the data from one single public communication network, and conversely changes the data that are sent by the applications from the private communication network to the public communication network as though they had been sent from a private communication network with only one application.

DE 101 59 636 B4 describes a method for controlling and/or monitoring resources and connections using the exchange of data between communication systems and at least one application, wherein the data have identifiers that differentiate the resources and the connections, and the identifiers of the resources are converted during the exchange such that they present themselves as the identifier of one single communication system with subscriber connections for the one or for each application, characterized in that each of the identifiers of the connection between resources of different communication systems comprises one local connection number (call ID) of the communication system that participates in the connection and one global connection number (call ID) and in that through the conversion the global connection number (call ID) is transmitted to the application such that it cannot be differentiated by the application from a local connection number (call ID).

At present, CTI services are accepted (executed) by a CTI server only if the associated device is located within the CTI domain. This means that devices outside the CTI domain can be addressed by an application only via their proxy (Trunk Device).

BRIEF SUMMARY OF THE INVENTION

Embodiments relate to methods and apparatus for establishing a telecommunication connection with a second communication terminal, controlled by a control program, wherein a CTI server in a CTI domain that is assigned to said CTI server makes a CTI service available to a first communication terminal. Furthermore, embodiments relate to a system for establishing a telecommunication connection controlled by a control program comprising at least one CTI server and at least one communication terminal that is located in the CTI domain of the at least one CTI server.

DETAILED DESCRIPTION OF THE INVENTION

Figure 1:
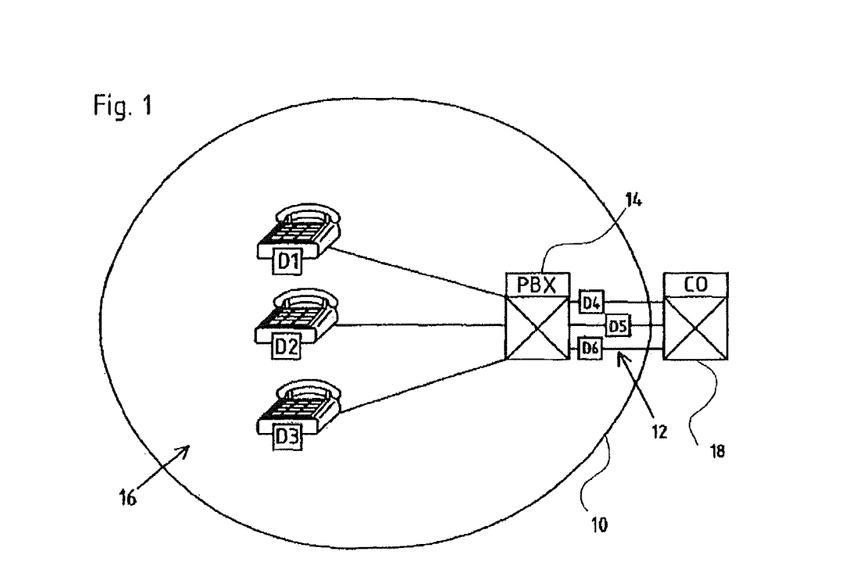
FIG. 1 schematically, a conventional arrangement of a CTI domain, i.e., with trunks as network interfaces.

FIG. 1 shows schematically a conventional arrangement including a CTI domain (switching SUB domain 10). This diagram is taken from the ECMA 269 (the standard CSTA model). A switching domain, a switching sub domain or a CTI domain is that region that is typically controlled by an application via CSTA.

Shown in the center of FIG. 1 is branch 14, e.g., OpenScape Office. Terminals D1, D2, D3, the telephones, or the trunks leading to the Central Office (CO) 18 as well as D4, D5, D6, the network interface devices, are connected there. The case at hand shows trunks D4, D5, D6 as network interface devices 12. It does not matter whether the devices are analog terminals or ISDN devices. The same applies to the trunks, which can be analog trunks, ISDN trunks or SIP trunks. Other devices D1, D2, D3, together designated with the reference number 16, are connected to PBX 14 within the domain 10. In general, the (CTI) application can transmit commands to all devices connected to this system.

This arrangement known from the prior art is carried out by transmitting the CTI service to the associated proxy (trunk device). This means that typical CTI applications use exclusively devices that are located within the CTI domain (switching SUB domain 10) for controlling, thus avoiding the problem of controlling a device directly, even if it is not located in the CTI domain. This problem may be addressed by the present invention.

According to an embodiment of the invention, a method is provided for establishing a telecommunications connection, controlled by a control program, with a second communication terminal, wherein a CTI service is made available to a first communication terminal by a CTI server in a CTI domain that is assigned to said CTI server, wherein the second communication terminal is located outside the CTI domain and is connected to the CTI server via a proxy located within the CTI domain, wherein the control program is connected to the CTI server via an intermediate functional unit, wherein the intermediate functional unit signals to the control program that instead of the proxy, the second communication terminal is connected as the telecommunication terminal into the established telecommunications connection, and wherein the intermediate functional unit instructs the CTI server to carry out the CTI service on the proxy in accordance with the control program.

Below, a voice connection is often used as a possible example of a telecommunication connection, but this should not be considered restrictive.

One advantageous embodiment of the invention, which has features that can also be combined with features of other embodiments of this invention, provides that if the second communication terminal is not connected to the first communication terminal, the intermediate functional unit signals to the control program that a virtual third communication terminal instead of the proxy is connected as the communication terminal into the established telecommunications connection within the CTI domain.

One advantageous embodiment of the invention, which has features that can also be combined with features of other embodiments of this invention, provides that the first voice connection is established between the first communication terminal and the second communication terminal, wherein the first voice connection is signaled to the control program as the first CTI service.

One advantageous embodiment of the invention, which has features that can also be combined with features of other embodiments of this invention, provides that the method furthermore comprises specifying a second voice connection in place of the first voice connection, wherein the second voice connection is arranged between the first communication terminal and a third communication terminal.

One advantageous embodiment of the invention, which has features that can also be combined with features of other embodiments of this invention, provides that the second voice connection corresponds to a second CTI service, wherein the CTI service appearing in the control program is the first CTI service.

One advantageous embodiment of the invention, which has features that can also be combined with features of other embodiments of this invention, provides that each of the first and/or second voice connections corresponds to a proxy and that the at least one CTI server is configured to carry out the CTI service with the respective valid proxy without utilizing knowledge of the respective dynamically changeable proxy.

One advantageous embodiment of the invention, which has features that can also be combined with features of other embodiments of this invention, provides that the intermediate functional unit is designed to transmit abstract data regarding the at least one CTI service to the control program via a proxy.

One advantageous embodiment of the invention, which has features that can also be combined with features of other embodiments of this invention, provides that the at least one CTI server defines a CTI domain and that at least one of the communication terminals is located outside the CTI domain.

One advantageous embodiment of the invention, which has features that can also be combined with features of other embodiments of this invention, provides that the change from the first to the second voice connection corresponds to either (i) a single step transfer or (ii) a change from CallMonitoring to the communication terminal connection.

Embodiments may provide for a computer program product or a computer program for establishing a telecommunication connection.

Embodiments may also provide for a machine-readable data carrier with a computer program product stored on the data carrier.

Furthermore, embodiments may provide for an arrangement for establishing a telecommunication connection controlled by a control program and comprising a CTI server, a first communication terminal that is located in the CTI domain of the CTI server, a second communication terminal that is located outside the CTI domain of the CTI server, and a control device.

Embodiments may solve the problem by the CTI server providing an abstraction level "Extra Domain Device" for the CTI server that is used to accept CTI services also without the aid or knowledge of the respective (dynamically changeable) proxy, even if the device is not located in the CTI domain. The CTI server then carries out this CTI service automatically at the respective valid proxy.

The advantageous introduction of an abstraction level "Extra Domain Device" for carrying out CTI services at devices that are located outside the CTI domain allows the high-level application to forgo the (dynamic) proxy administration and instead concentrate on the actual device. A change in the logic (paradigm shift) is no longer necessary for CTI control. The high-level application retains the device to be controlled and a change to the proxy no longer takes place. The CSTA single step transfer example listed in the description can be applied to other CSTA services (Call Control and others).

Embodiments are described below in more detail based on preferred exemplary embodiments and with reference to the figures.

Embodiments of the invention are explained, for example, with reference to certain CTI-based telecommunication systems, namely OpenScape Voice or OpenScape Office, respectively. Such systems are created according to the CSTA standard (Computer-Supported Telephony Applications) of ECMA (http://www.ecma-international.org/activities/Communications/TG11/cstaIII.htm). However, it is understood that different systems are available as the basis for implementing the invention.

Unless stated otherwise, the individual design features of the system, combination of components, steps of the method or other techniques disclosed herein according to the embodiments of the present invention can be combined with any or all other design features of the system, combination of components, steps of the method or other techniques disclosed herein.

Figure 2:
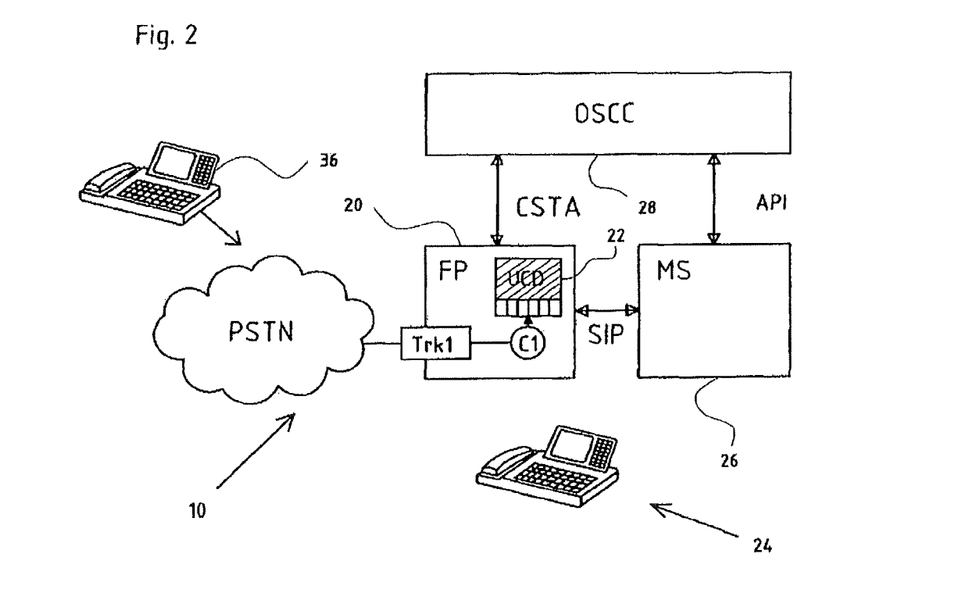
FIG. 2 schematically, an arrangement of system components for carrying out a planned call sequence process according to a currently familiar system (callcenter operation of OpenScape Office)

FIG. 2 shows schematically an arrangement of system components for carrying out a planned call sequence process according to a currently familiar system (callcenter operation of OpenScape Office); In OpenScape Office, call A is placed in the waiting queue.

The solution is further demonstrated using the example of the OpenScape Contact Center V9.0 by applying the CSTA service Single-Step Transfer and general call monitoring. Utilization of comparable services is conceivable.

A. Planned call sequence with OpenScape Contact Center V9.0 using OpenScape Office or OpenScape Smart Office.

Essentially, the following components are involved in OpenScape Office or OpenScape Smart Office for the callcenter operation using the OpenScape Contact Center V9.0:

Feature Processing (FP)

The FP—a CTI server 20—provides the queue and the call center distribution (UCD) 22 as well as its agents 24 (integral component of the communication servers or autonomous platform); in other words, Feature Processing is a telephone system, a partial system of OpenScape Office.

Media Server (MS)

Media Server 26 is connected to the CTI Server 20 via SIP.

OpenScape Contact Center (OSCC)

The callcenter application 28 is connected via CSTA and the MS API (Application Programming Interface) and distributes callcenter calls to announcements, agents (e.g., third terminal 24) and the queue.

If a device is located in this OpenScape Office Domain or if a device that is not directly a part of this domain is to be controlled, then the application 28 must be notified to select a trunk, which in application 28 is not a fixed but a variable anchor.

It is known that the OpenScape Contact Center (OSCC; transmission application) implements announcement handling for announcements (e.g., "Hello, welcome, please press "1" . . . ") using analog terminals. A media server 26, which is already used in OpenScape Voice, is inserted instead of the costly analog terminals (MS) into the overall system in another possible embodiment. Embodiments of the present invention use the latter.

Initially (not shown in the figure), caller A is placed into the queue of the UCD 22 in the connection C1 at the first terminal 36 (via PSTN and line Trk 1) in the FP (CTI server 20) of OpenScape Office or OpenScape Smart Office. When a call arrives (FP), the caller A (at the first terminal 36) reaches the platform via a trunk Trk1, is placed in a queue UCD22 and waits there for further processing. The contact center (application 28) is notified about this via CSTA. The contact center (application 28) accepts the call, makes an announcement, and the call is then transferred from the first connection (connection 1: C1) to an analog announcement device. It is known to be an analog terminal, advantageously a media server 26, and the insertion is carried out via SIP.

As shown in FIG. 1, announcements are analog terminals and the announcement device is located in the switching subdomain 10. An application (e.g., OpenScape Voice (OSV) or HiPath 8000—Softswitch from Unify GmbH & Co. KG) always has access to it. In a future implementation, in which the media server 26 (FIG. 2) is inserted via SIP, this is a connection via a network interface device (see right side in FIG. 1), which means the media server 26 is not in but outside the CTI domain 10'.

As shown in FIG. 2, the CTI domain 10' is the FP (CTI server 20), and from the perspective of CSTA is not located inside domain 10'. The OpenScape contact center application 28 has a connection FP to CSTA and a different interface with the media server 26.

Figure 3:
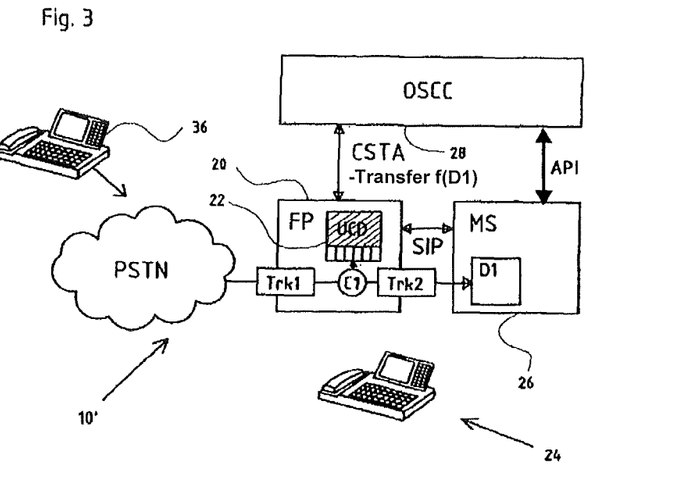
FIG. 3 schematically, the system from FIG. 2 later in the process (call switched to media server announcement)

FIG. 3 shows schematically the system from FIG. 2 later in the process. If no agent is available at the third terminal 24 or if a greeting announcement is to be played, then caller A is switched by the callcenter application 28 (OSCC) at the first terminal 36 out of the queue onto a SIP trunk (Trk 2) (using CSTA Deflect Call in the case of OpenScape Office and OpenScape Smart Office).

Since media server 26 is connected via a native SIP, the call can be identified simply via the phone number. For this purpose, an extension is added by the OSCC for the transfer.

Call=Dialing the media server+individual extension=>D1

The goal is an arrangement with which the call (C1) leaves the FP 20 and is switched to the media server 26 for playing an announcement; an announcement device (second terminal D1) is then located in the media server 26. In the case at hand, this is accomplished via SIP. Since supplementary information cannot be transmitted via SIP, the announcement device D1 is identified by an extension in the media server 26.

Example

When caller A dials "7007", the call would arrive at "7007" on the media server 26 and with "510" the personal terminal, which corresponds to D1, would be reached. D1, D2 or D3 can be addressed by an extension via SIP. The call (C1) is a selection of the media server 26 and an individual extension by which D1 is identified.

The CSTA Deflect Call command transfers the call from UCD 22 to the second terminal D1 in the media server 26. When this occurs, UCD 22 is not connected and caller A at the first terminal 36 has a connection from the trunk Trk1 to the media server 26. Application 28 then receives this information at CSTA trunk Trk1 and trunk Trk2.

For continued processing of the call (C1, . . . ), the application 28 would then have to check continuously on which trunk (Trk1, Trk2, . . . ) the call is taking place. This does not necessarily occur via trunk Trk1 or Trk2; it could also be trunk 3 or trunk 4.

The Deflect Call applied via CSTA is now a function of D1–f(D1).

The SIP trunk (Trk1) then plays an announcement from the call center (OSCC) via MS. This is a fully qualified bidirectional communication.

The call from caller A at the third terminal 24 is switched by the OSCC as f(D1) to a SIP announcement of media server 26.

Once the announcement has been played, the call C1 is to be passed on to an agent at the third terminal 24. This is typically done using a single-step transfer.

B. Single-Step Transfer

Figure 4:
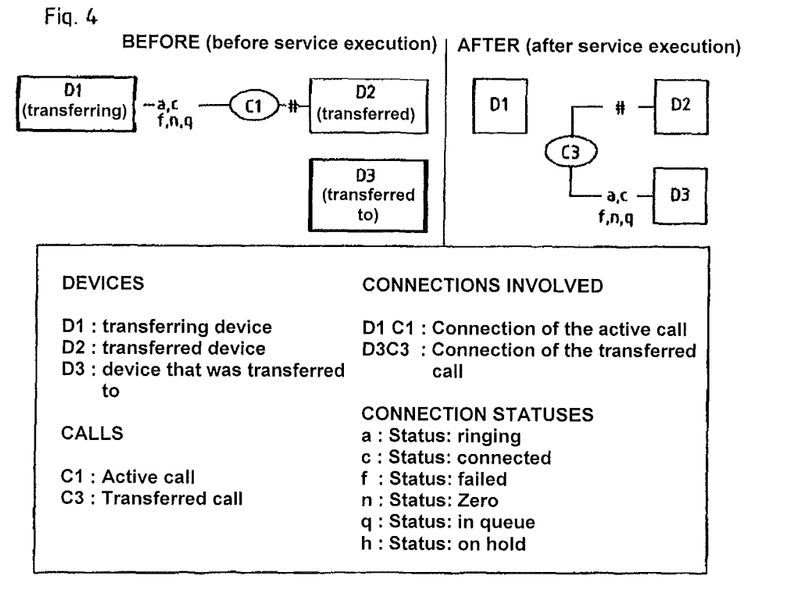
FIG. 4 schematically, connection changes for a single-step transfer according to the CSTA standard.

FIG. 4 shows schematically connection changes for a single-step transfer according to the CSTA standard. Based on the presentation in FIG. 3, the CSTA service single-step transfer (SST) of the callcenter application 28 (OSCC) allows for the call C1 to be switched from the SIP media server 26 to any desired target (e.g., agent at the third terminal 24).

FIG. 4 is a diagram from ECMA-269: According to ECMA-269, this service should be represented on the devices (here Trk2=>as function f(Trk2)) known to CSTA domain 10'.

The single-step transfer call service transfers an existing connection C1 from one device D1 to another device D3. FIG. 4 shows how terminal D1 communicates with a terminal D2 and releases a command "single-step transfer" from D1 to terminal D3, causing D2 to call D3.

This transfer is carried out in one step, which means the device 2 that carries out the transfer must not guide the existing connection C1 to the queue prior to the output of the single-step transfer call service.

The state of the connection C3 to be transferred can be alerting, connected, failed, held, or queued.

Example

| SIP-Trunk Trk 2 SingleStepTransferRequest | FP | |
|---|---|---|
| activeCall deviceToTransferTo SingleStepTransferResult | Trk 2 C1 Agent | FP Proxy Trk 2 ! |

However, the "level of knowledge" of the proxy at the call center application 28 is not ensured.

A change in the logic (paradigm change) occurs from the perspective of the application 28.

The CTI service changes from f(D1) to f(Trk 2).

Figure 5:
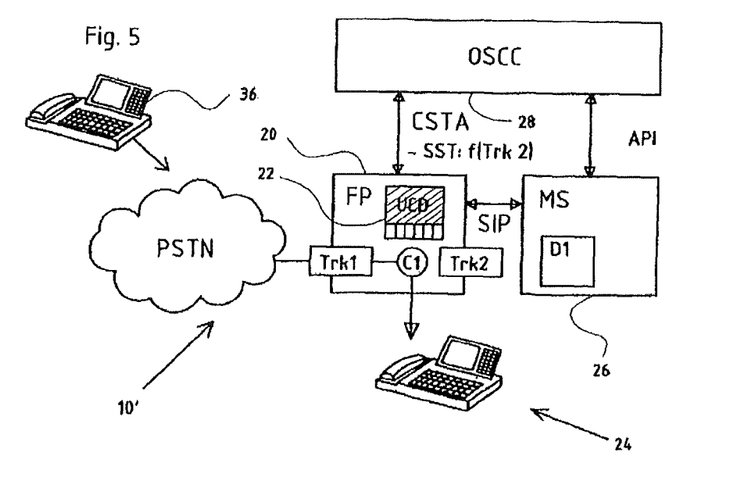
FIG. 5 schematically, an implementation of the single-step transfer according to FIG. 4 in the system from FIG. 3.

FIG. 5 shows schematically an implementation of the single-step transfer according to FIG. 4 in the system from FIG. 3. Here, call A is switched by the OSCC 28 as f(Trk 2) from the media server 26 proxy trunk to an agent at the third terminal 24 (FIG. 3 is a prerequisite).

The SIP trunk (Trk2) shown in FIG. 5 determines the proxy to the announcement device D1 of the media server 26. While from the perspective of the call center application 28 the SIP trunk is a variable, potentially unknown quantity, the announcement device (second terminal D1) of the media center 26 is a constant and always a known quantity from the perspective of the call center application 28.

Normally the "deflectCall" command would have to be "Trunk Trk2 to agent" (third terminal 24). The problem is that the OSCC application 28 is actually configured such that it does not know anything about these trunks. The OSCC application 28 has one peculiarity: It is traditionally configured such that it recognizes only the following trunks: the true trunks of the central office 18, the UCD 22 (FIG. 1) and the agents (third terminal 24). This means that there are actually no statements about the call (connection) C1. The call C1 is now at trunk Trk2, but the application 28 does not know trunk Trk2. According to the invention, this requirement has been solved.

The following occurs from the application perspective of the application 28: It places a Deflect Call to the second terminal D1 and in the continued progress must control a trunk Trk2, which it may not know.

The single-step transfer must occur onto the trunk Trk2. For the call C1 of the media server 26 to get from terminal D1 to the agent (third terminal 24), a single-step transfer command must occur at CSTA (application 28) for trunk 2, whereupon the call C1 moves to the agent (third terminal 24).

The problem is now that the trunk is not known and that application 28 can only use components that it recognizes. The only one that application 28 knows in the case at hand is the second terminal D1. However, D1 is not in the CTI domain 10'. The invention solves this problem that the application 28 can place the command onto D1 even though D1 is not in the platform (CTI domain 10').

Figure 6:
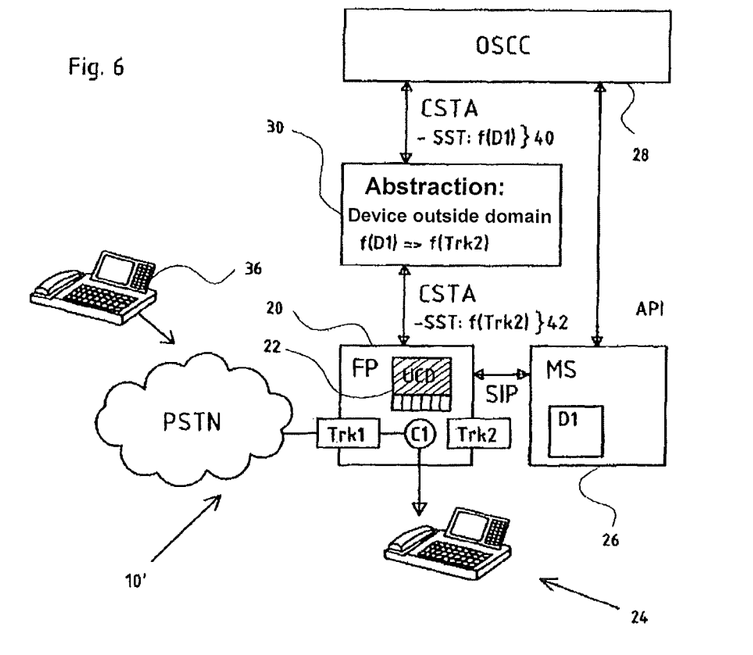
FIG. 6 schematically, a first arrangement of system components for carrying out an exemplary embodiment (single-step transfer) of a method according to the invention using an extra domain device.

FIG. 6 shows schematically a first arrangement of system components for carrying out an exemplary embodiment of a method according to the invention using an extra domain device 30, namely for the case of a single-step transfer. Here, the call of caller A (first terminal 36) is switched by the OSCC as f(D1) from the announcement device SIP media server 26 to an agent (third terminal 24) (prerequisite is again FIG. 3). The implementation occurs as described above with reference to FIGS. 1-5, with the exception of the implementations below.

The second terminal D1 is located outside the CTI domain 10'; thus, the extra domain device 30 is provided according to the invention. The extra domain device 30 initially allows the system to recognize/check whether (i) a device D1 is connected, (ii) it is a valid D1, (iii) where the proxy is located, (iv) the statuses for the proxy are correct and (v) how the command is implemented on the proxy.

In the case at hand, the call (C1) was queued at the UCD and the application 28 determined "deflect call to D1". The application 28 now issues the command to return the call and to carry out a "single-step transfer D1 to the agent". The new layer (domain device 30) now determines for the D1 the dynamic internal trunk, which the application 28 does not yet recognize. Now, the application 28 knows only the UCD 22, the third terminal 24 of the agent and the D1. This interim layer assumes the trunks.

The abstraction level "extra domain device" introduced here can carry out its task also directly in the CTI server 20 (FP). This is sensible primarily within a network (e.g., via SIP-Q), where a callcenter application 28 serves several nodes at the same time.

With the introduction of an abstraction level the CTI server 20 (FP) provides a capability for the CTI services that is used to accept CTI services also without the aid or knowledge of the respective (dynamically changeable) proxy, even if the device D1 is not located in the CTI domain 10'. The CTI server 20 then carries out this CTI service automatically at the respective valid proxy.

From the perspective of the callcenter application (OSCC) 28, this results in the following CTI call-up to an extra domain device that is unknown in the CTI domain 10' (here: D1=>as function f(D1)):

| SIP-Trunk Trk 2 SingleStepTransferRequest | FP | |
|---|---|---|
| activeCall deviceToTransferTo SingleStepTransferResult | D1 C1 Agent | Media Server Device D1 |

This call-up is now carried out automatically for the proxy within the abstraction level "extra domain device" 30.

Now, no change in the logic (paradigm change) occurs from the perspective of the application.

The CTI service remains f(D1).

Thus, with the aid of this abstraction level (extra domain device 30), a first CTI service (SST:f(D1)) 40 is signaled via CSTA between extra domain device 30 and application 28 and a second CTI service (SST:f(Trk 2)) 42 is signaled via CSTA between extra domain device 30 and CTI server 20.

The tasks of this abstraction level "extra domain device" 30 are:

Evaluation D1
Checking the existence of D1
Determining the (dynamic) proxy Trk 2
Plausibility check
Implementation on the proxy Trk 2.

Figure 7:
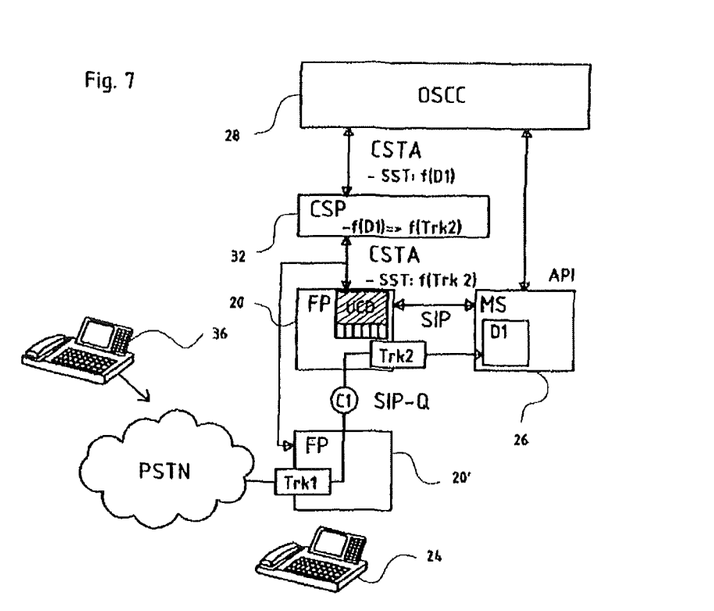
FIG. 7 schematically, a second arrangement of system components for carrying out an exemplary embodiment (single-step transfer) of a method according to the invention using middleware (CSP)

FIG. 7 shows schematically, a second arrangement of system components for carrying out an exemplary embodiment (single-step transfer) of a method according to the invention, i.e., application in the network with additional middleware 32 (CSP); In this case of OpenScape Office and OpenScape Smart Office, it is a CSP (CSTA service provider).

According to certain embodiments of the invention, the middleware networks with several layers (Trk1 and Trk2). According to current middleware technology, they are presented as only one switch. The switches (Trk1 and Trk2) do not know of the networking and of the multiple nodes. Thus, the invention can be applied in the network, i.e., across nodes.

A call can arrive via gateway nodes; the application 28 knows the trunk; the UCD 22 can be located in another node and the mediaserver 26 could be switched in at a third node (not shown). However, most often this works directly; the one or the other trunk is connected to the media server 26, and it is not necessary for the media server 26 to know this trunk. The media server 26 only needs to know the D1 again and then place the "single-step transfer" command from D1 to the agent.

C. Call Monitoring

Figure 8:
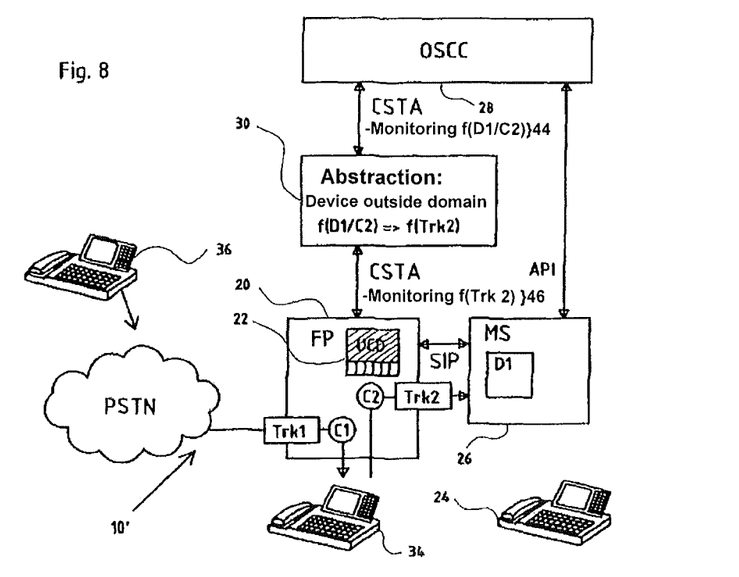
FIG. 8 schematically, a third arrangement of system components for carrying out an exemplary embodiment (CallMonitoring) of a method according to the invention using an extra domain device.

FIG. 8 shows schematically a third arrangement of system components for carrying out an exemplary embodiment of a method according to invention using an extra domain device 30, in this case call monitoring.

The use of the extra domain device 30 does not apply only to a special functionality/CTI service in the CSTA, rather it is generally applicable and can also be applied to the call monitoring CTI service as well as for incoming and outgoing calls.

A message that a call has arrived at D1 follows, and at the beginning a monitor point is set to the second terminal D1.

In call monitoring, a monitor point can be set temporarily to the device that is located outside the CTI domain 10'. This type of application allows for registering changes in the communication, for example through a transfer after a callback into the callcenter (see section B).

In FIG. 8, one subscriber at the fourth terminal 34 (e.g., switching location) is in a callback to the callcenter on the connection C2. The subscriber hears an announcement (see FIG. 3) from the device D1 of the media server 26. The original call is retained at the connection C1, When this callback is passed on to the callcenter, the connection typically changes its value; a connection C3 arises (see FIG. 9).

Figure 9:
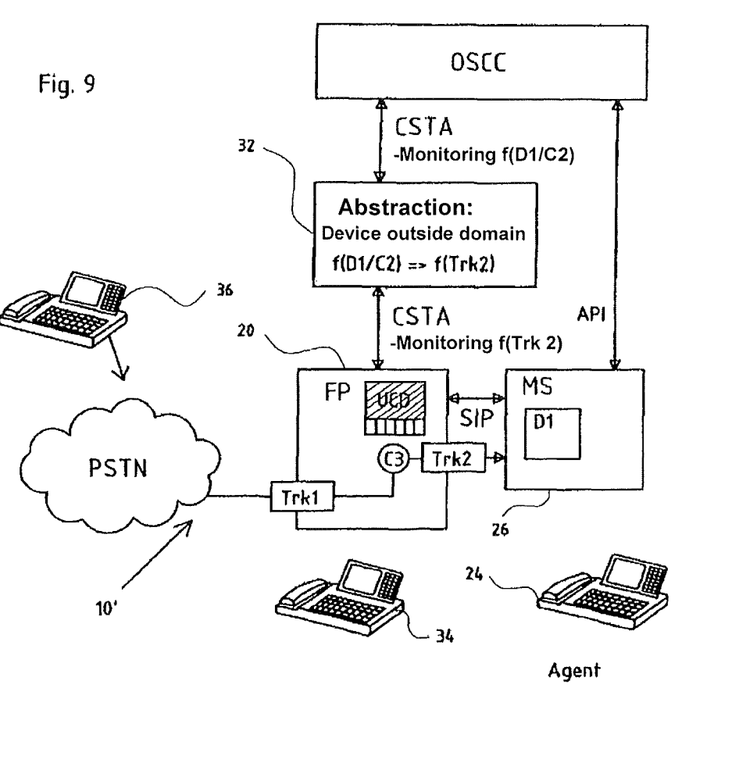
FIG. 9 schematically, a third arrangement of system components for carrying out an exemplary embodiment (CallMonitoring) of a method according to the invention using middleware (CSP).

FIG. 9 shows schematically a third arrangement of system components for carrying out an exemplary embodiment of a method according to the invention using middleware (CSP) in the case of CallMonitoring. Here, a callback is switched to the callcenter (change of the connection).

The detailed sequence is presented in Table 2.

TABLE 2

CSTA events for the "Extra Domain Device"

| Service and Events | Device Trk 2 | Device Dn | Comments |
|---|---|---|---|
| . . . | | | The call has been diverted from UCD device D3 to OMS |
| DeliveredEvent | | | The call is alerting OMS Dn. |
|   connection | Trk2 C2 | | |
|   alertingDevice | Dn | | |
|   callingDevice | Subscriber | | |
|   calledDevice | UCD | | |
|   lastRedirectionDevice | UCD | | |
|   localConnectionInfo | Connected | | |
|   cause | newCall | | |
| MonitorStartRequest | | | OSCC starts monitoring OMS device Dn. |
|   monitorObject | | Dn C2 | |
| MonitorStartResult | | | Monitor on Device Dn as a model of Trk 2 (optional) |
|   crossReferenceID | | | |
| EstablishedEvent | | | OMS answers the call and plays announcement. |
|   establishedConnection | Trk2 C2 | Dn C2 | |
|   answeringDevice | Dn | Dn | |
|   callingDevice | Subscriber | Subscriber | |
|   calledDevice | UCD | UCD | |
|   lastRedirectionDevice | UCD | UCD | |
|   localConnectionInfo | Connected | Connected | |
|   cause | newCall | newCall | |
| TransferredEvent | | | Call is transferred. |
|   primaryOldCall | Trk2 C2 | Dn C2 | |
|   transferringDevice | Subscriber | Subscriber | |
|   transferredToDevice | Dn | Dn | |
|   transferredConnection | Trk 1 C3 | Trk 1 C3 | |
| | Trk 1 C1 | Trk 1 C1 | |
| | Caller A | Caller A | |

TABLE 2-continued

CSTA events for the "Extra Domain Device"

| Service and Events | Device Trk 2 | Device Dn | Comments |
|---|---|---|---|
| transferredConnection | Trk 2 C3 | Dn C3 | |
|  | Trk 2 C2 | Dn C2 | |
|  | Dn | | |
| localConnectionInfo | Connected | Connected | |
| cause | transfer | transfer | |
| . . . | | | |

A conversion from proxy trunk Trk 2 to the—from the perspective of the CTI domain 10'—external device Dn can take place additionally at the temporary monitor point for the "extra domain device" 32 (Dn).

The advantageous introduction of an abstraction level "Extra Domain Device" 30, 32 for carrying out CTI services at devices that are located outside the CTI domain 10' allows the high-level application 28 to forego the (dynamic) proxy administration and instead concentrate on the actual device.

Thus, with the aid of this abstraction level (extra domain device 30), a first CTI service (MONITORING:f(D1, C2)) 44 is signaled via CSTA between "extra domain device" 30 and application 28, and a second CTI service (SST:f(Trk 2), MONITORING:f(Trk2)) 46 is signaled via CSTA between "extra domain device" 30 and application 28 and CTI server 20.

A change in the logic (paradigm shift) is no longer necessary for CTI control. The high-level application 28 retains the device to be controlled and a change to the proxy no longer takes place.

The examples of CSTA single-step transfer and call monitoring provided here can also be applied to other CSTA services (call control and others).

The extra domain device 30 can be an extra server, middleware or software, or can be implemented on the platform.

Single-step transfer and call monitoring are only examples of various functionalities that can be simplified by the invention.

One advantage is that the high-level application 28 does not need to concern itself about where the limits of the CTI domain 10' are. It can utilize the fact that other devices can be controlled by the application 28 as well, although they are located outside the CTI domain 10', without having to concern itself with which additional resources are used internally in the call processing in this platform, how to address them, etc. This is taken away from the application 28, thus making the function simpler.

In addition to the two examples mentioned above (call monitoring and single-step transfer), there are other functionalities where this abstraction level could be advantageous, e.g., device monitoring of the CSTA.

It should be noted that the features of the invention described by referencing the presented embodiments, for example CTI server, media server, control program (application), data structures, extra domain device (the type and configuration of the used parameters, control commands, protocols and hardware components, the arrangement of the individual components in relation to each other or the sequence of the respective process steps) can also be present in other embodiments or variations hereof, unless stated otherwise or prohibited for technical reasons. Not all features of individual embodiments described in combination must necessarily always be implemented in any one particular embodiment.

ABBREVIATIONS

ACD Automatic Call Distribution
API Application Programming Interface
CSTA Computer Supported Telecommunications Applications
C1, C2, C3 Connection
D1, D2, D3 (Subscriber) Device
ECMA-269 Standard ECMA-269. Services for Computer Supported Telecommunications Applications (CSTA) Phase III. 9th edition (December 2011).
FP Feature Processing
f( . . . ) Function of . . .
MS Media Server
OSCC OpenScape Contact Center
PSTN Public Switched Telephone Network
SIP Session Initiation Protocol
SIP-Q Network Protocol CorNet-NQ tunneled via SIP
SST CSTA Service Single Step Transfer
Trk1, Trk2 (Network) Trunk
UCD Universal Call Distribution (ACD solution of the OpenScape Office and OpenScape Smart Office)

LIST OF REFERENCES WITH FEATURES

10, 10' CTI Domain
12 Network Interface Device
14 Branch/PBX
16 Device
18 Central Office
20 CTI Server
22 Callcenter Distribution/UCD
24 Third Communication Terminal/Agent
26 Media Server
28 Control Program
30 Intermediate Functional Unit/Abstraction Level
32 Intermediate Functional Unit
36 First Communication Terminal/Caller
40 First CTI Service
42 Second CTI Service
44 First CTI Service
46 Second CTI Service

We claim:
1. A method for establishing a terminal telecommunication connection with a second communication terminal, controlled by a control program of a central office, wherein a computer-telephony integration ("CTI") service is made available to a first communication terminal by a CTI server in a CTI domain that is assigned to said CTI server, comprising:

connecting the second communication terminal located outside the CTI domain to the CTI server via a proxy located inside the CTI domain;

connecting the control program to the CTI server via an intermediate functional unit;

signaling, through the intermediate functional unit, to the control program of the central office that the second communication terminal acts as a third communication terminal that is connected to the CTI server in an established telecommunication connection in place of the proxy, and instructing, through the intermediate functional unit, the CTI server to carry out the CTI service at the proxy in accordance with the control program of the central office, wherein carrying out the CTI service establishes the terminal telecommunication connection.

2. The method of claim 1, further comprising, if the second communication terminal is not connected to the first communication terminal, signaling, through the intermediate functional unit, to the control program of the central office, a virtual communication terminal inside the CTI domain as a fourth communication terminal that is connected in the established telecommunication connection in place of the proxy.

3. The method of claim 1, further comprising establishing a first telecommunication connection between the first communication terminal and the second communication terminal, wherein the first telecommunication connection signals to the control program as a first CTI service.

4. The method of claim 3, further comprising specifying a second telecommunication connection in place of the first telecommunication connection, wherein the second telecommunication connection is located between the first communication terminal and the third communication terminal.

5. The method of claim 4, wherein the second telecommunication connection corresponds to a second CTI service, wherein the CTI service in the control program is the first CTI service.

6. The method of claim 4, wherein each of the first telecommunication connection and second telecommunication connection corresponds to a proxy, and wherein the CTI server is configured to implement the CTI service automatically with a respective valid proxy without utilizing knowledge of a respective dynamically changeable proxy, wherein the intermediate functional unit transfers data via an abstraction level with regard to the at least one CTI server via the proxy to the control program of the central office.

7. The method of claim 4, wherein a change from the first telecommunication connection to the second telecommunication connection corresponds to a member of the group consisting of (i) a single-step transfer and (ii) a change from call monitoring to the communication terminal connection, wherein the CTI server defines a CTI domain, and wherein at least one of the communication terminals is located outside the CTI domain.

8. A non-transitory computer readable medium having an executable computer program stored thereon that, when executed by a communication device of a central office configured as a private branch exchange (PBX) or a softswitch device, establishes a telecommunication connection by carrying out out the method of claim 1.

9. A system for establishing a telecommunication connection controlled by a control program of a central office, comprising:

a CTI server, a first communication terminal that is located in a CTI domain of the CTI server, a second communication terminal that is located outside the CTI domain of the CTI server, and a control device of the central office configured as a private branch exchange (PBX) or a softswitch device that is for carrying out the method according to claim 1.

10. The method of claim 1, wherein the intermediate functional unit is a server.

11. The method of claim 1, comprising:

the intermediate functional unit accepting the CTI service while forgoing dynamic proxy administration.

12. The method of claim 11, wherein the proxy is not changed for the CTI service.

13. The method of claim 1, comprising:

the CTI server providing queue and call distribution;

and wherein the CTI server and the first communication terminal are within a network.

14. The method of claim 13, wherein the terminal telecommunication connection is a connection between the first communication terminal and the second communication terminal.

15. The method of claim 13, comprising:

a gateway receiving a call from the second communication terminal prior to the connecting of the second communication terminal located outside the CTI domain to the CTI server via the proxy located inside the CTI domain.

16. The method of claim 13, wherein the CTI service is call monitoring such that a monitor point is set for the second communication terminal.

17. The method of claim 13, wherein the intermediate functional unit is a server.

18. The method of claim 17, comprising:

the intermediate functional unit accepting the CTI service while forgoing dynamic proxy administration.

19. The method of claim 1, wherein the central office comprises a private branch exchange (PBX) that runs the control program or a softswitch device that runs the control program.

20. The method of claim 19, wherein the central office is a contact center configured to distribute calls.

* * * * *